United States Patent Office 3,746,749
Patented July 17, 1973

3,746,749
METHOD FOR PRODUCING CARBOXYLIC ACID UNSATURATED ESTERS
Tetsuo Mitsuyasu and Jiro Tsuji, Kamakura, Japan, assignors to Toray Industries, Inc., Tokyo, Japan
No Drawing. Filed Aug. 10, 1970, Ser. No. 62,641
Int. Cl. C07c 67/04
U.S. Cl. 260—497 A         10 Claims

ABSTRACT OF THE DISCLOSURE

Producing a carboxylic acid unsaturated ester by reacting a conjugated diene and carboxylic acid in the presence of a palladium catalyst, with alkali carboxylate present in the reaction system.

FIELD OF THE INVENTION

The reaction between a conjugated diene and a carboxylic acid, carried out by using butadiene as the conjugated diene in accordance with this invention, can be represented as the following reaction.

$$R-CO_2H + CH_2=CH-CH=CH_2 \longrightarrow$$

$$CH_2=CH-CH_2-CH_2-CH_2-CH=CH-CH_2-O-\overset{O}{\underset{\|}{C}}-R \quad (I)$$
$$+$$
$$CH_2=CH-CH_2-CH_2-CH_2-\underset{\underset{\underset{O}{\|}}{\overset{|}{O-C-R}}}{CH}-CH=CH_2 \quad (II)$$

wherein R represents hydrogen, alkyl group having from 1 to 30 carbon atoms, or hydrocarbon or substituted hydrocarbon radical having from 1 to 30 carbon atoms.

The employment of highly expensive palladium catalyst is an important factor in the reaction of the present invention, and we have carried out extensive researches in an effort to find a method for increasing the catalytic activity of palladium catalyst so that the minimum amount of palladium can attain the required efficiency. As a result of these researches, we have discovered that the catalytic activity of palladium can be increased and its durability prolonged by practicing the method of this invention; as a result, the catalytic efficiency of this catalyst is remarkably increased.

The term "catalytic efficiency" as used herein means the molar ratio of the unsaturated ester produced per one molecule of palladium catalyst in one reaction.

DESCRIPTION OF THE PRIOR ART

It is known to provide a method according to which zero valent palladium and triphenyl phosphine are used as the catalyst (Hagihara/Bull. Chem. Soc. Japan, 41 454 [1968]). Also, divalent palladium and triphenyl phosphine have been described as the catalyst (Dutch patent publication No. 68–16008).

In contrast, we have discovered that a remarkable effect is obtained when an alkali metal carboxylate is used as an activator along with palladium catalyst.

SUMMARY OF THE INVENTION

The present invention is a method for producing carboxylic acid unsaturated esters by reacting a conjugated diene and a carboxylic acid in the presence of palladium catalyst with an alkali metal carboxylate present in the reaction system.

DESCRIPTION OF THE PREFERRED EMBODIMENTS

As the carboxylic acid which is a starting material according to the present invention, essentially any compound can be used if it has at least one carboxyl radical. However, as preferred examples of the carboxylic acids, the following compounds can be listed: Saturated or unsaturated aliphatic acids such as: formic, acetic, propionic, butyric, caprylic, capric, stearic, palmitic, cyclohexancarboxylic, oxalic, succinic, tartaric, adipic, sebacic, dodecanoic, acrylic, methacrylic, fumaric, itaconic, muconic, oleic and cinnamic.

Also included are aromatic carboxylic acids such as: benzoic, paranitrobenzoic, chlorobenzoic, phthalic isophthalic, terephthalic, trimellitic, anisic, naphthalene carboxylic, prenitic and pyromellitic.

Also included are various aliphatic carboxylic acids having various substituents, such as chloroacetic acid, dichloroacetic acid, glycine, lactic acid, cyanacetic acid and phenyl acetic acid, for example.

Especially preferable acids include aliphatic acids such as formic, acetic, propionic, butyric, capric and adipic acid and glycine, and aromatic carboxylic acids such as benzoic, toluylic, naphthalic and naphthalene carboxylic acid.

As the conjugated diene which is another starting material of this invention, any compound having a conjugated double bond such as 1, 3-butadiene or the derivatives thereof, can be used.

Useful derivatives of 1,3-butadiene include those wherein one or more hydrogen atoms are substituted by alkyl radicals or any radicals or halogen atoms which do not adversely affect the reaction, but more in particular, a conjugated diene having four carbon atoms on the main chain is preferable.

As examples of such conjugated dienes, the following are listed: 1, 3-butadiene, isoprene, chloroprene, 2-ethyl-1, 3-butadiene and 2, 3-dimethyl-1, 3-butadiene.

It is not necessary to use a refined conjugated diene as the conjugated diene to be used in the present invention. Mixtures may be very conveniently used.

For example, butadiene containing a hydrocarbon mixture which is generally called a "BB fraction" or a "$C_4$ fraction" can be used.

1-, or 2-butene, isobutene and similar mono-olefins contained in the said mixture hardly participate in the reaction but butadiene only is reacted.

The so-called "$C_5$ fraction" can be used also.

Any palladium catalyst can be used, but zero valent or divalent palladium are found most effective.

More specifically, useful palladium salts include palladium chloride, palladium oxalate, palladium iodide, palladium acetate, palladium benzoate, palladium nitrate, palladium sulfate, complexes of divalent palladium such as palladium acetylacetonate, palladium oxime complex $\pi$-allyl palladium chloride and olefin complexes such as tetrakis (triphenylphosphine) palladium, bis (triphenylphosphine) palladium, and zero valent palladium complexes such as bis $\pi$-allyl palladium and the like.

Among those listed above, the compounds especially preferable are palladium salts of carboxylic acid such as formic acid, acetic acid, propionic acid, benzoic acid and phthalic acid, for example.

The characteristic of the method of this invention redies in the addition of an excess amount of alkali carboxylate to the reaction system.

Suitable alkali metals are lithium, sodium, potassium and rubidium, but among these sodium and potassium are especially preferable.

Alkali salts of any carboxylic acid to be used as the starting material in the present invention are preferable.

On the other hand, alkali salts of carboxylic acids may be produced in the reaction system by adding caustic potash, sodium carbonate or potassium carbonate to the reaction system.

We have discovered that when the above mentioned alkali salts of carboxylic acids are present, the catalytic activity of palladium catalyst is increased remarkably, that the reaction velocity is promoted, and that as a result the efficiency of the catalyst is improved.

As is apparent from the following examples, alkali salts of carboxylic acids bring about remarkably advantageous results in the practice of the method of this invention.

In regard to the amount of alkali metal carboxylate used in this invention, this may be from 5 to 100,000 mols based on the amount mols of palladium, or from 0.1 to 10 mol based on the amount mols of free carboxylic acid, but the amount of alkali carboxylate can be appropriately selected in accordance with the amount and kind of the carboxylic acid and the solvent to be used in the reaction.

The catalytic activity of the catalyst of this invention can be increased further by mixing a trivalent phosphorus compound, or an arsenic compound into the reaction mixture.

As examples of trivalent phosphorus compound, phosphine and phosphine are effective, but in particular, aromatic phosphine compounds bring about remarkably excellent results.

As concrete examples of trivalent phosphorus compounds, the following are listed: triphenylphosphine, tri (paratolyl) phosphine, tris (parachlorophenyl) phosphine, tris (paramethoxyphenyl) phosphine, trinaphthylphosphine and ethylene bis (diphenylphosphine).

However the useful trivalent phosphorus compounds are not restricted to those given above.

As trivalent arsenic compounds, arsine compounds are effective, particularly aromatic arsine compounds. Concrete examples include triphenylarsine, tritolylarsine, tris (parachlorophenyl) arsine, tris (paramethoxyphenyl) arsine, trinaphthylarsine and ethylene bis (diphenylarsine).

The aromatic arsine compounds to be used in the method of this invention are not restricted to those just mentioned.

In addition to the foregoing palladium compounds, other complex salts may be used wherein trivalent phosphorus or arsenic is oriented in said palladium compound, such as dichloro-bis (triphenylphosphine) palladium, π-allyltriphenylphosphine chloride, etc. In this case, it is not necessary to add any phosphorus or arsenic component separately.

The preferred amount of trivalent phosphorus or arsenic compound to be added to the palladium, is from 2 to 1,000 mol per mol of palladium.

It is considered that the equivalent amounts of the above mentioned phosphorus or arsenic compounds produce complex salts along with the palladium, but that excess amounts of the phosphorus or arsenic compounds, over and above the amount required for producing the complex, function to stabilize the palladium and surprisingly tend to prolong the catalytic activity.

The method of the present invention can be carried out by using only the carboxylic acid and the conjugated diene as the organic medium, but it is preferable to use an appropriate solvent.

For example, the method of the present invention can be carried out very smoothly when the solvent is alcohol, ether, ester, ketone, acid amide, sulfoxide, or a hydrocarbon other than conjugated diene.

As concrete examples of such solvents, the following can be listed:

Alcohols such as propanol, isopropanol, n-butanol, isobutanol, tert-butanol, n-amyl, alcohol, isoamyl alcohol, tert-amyl alcohol, 1-hexanol, 2-hexanol, cyclohexanol, 2-ethyl hexanol, benzyl alcohol, 2-methoxyethanol, glycerol, pentaerithrythol, 2-ethoxyethanol, phenol and chlorophenol, ketones such as acetone, 2-butanone, 3-pentanone, cyclopentanone, cyclohexanone, 4-methyl-2-pentanone, aliphatic or aromatic hydrocarbons such as benzene, toluene, xylene, pentane, hexane, cyclohexane, heptane, ethers such as diethylether, diisopropyl ether, tetrahydrofurane, dioxane, dimethoxyethane, anisole, esters such as ethyl propionate, ethyl lactate, nitriles such as acetonitrile, benzonitrile, amides such as dimethylformamide, dimethylacetamide, and sulfoxides such as dimethylsulfoxide, diethylsulfoxide.

In regard to the amount of the additives listed above, generally from 0.05 mol to the equimol based on the amount of carboxylic acid or even an excess may be used.

The method of the present invention can be carried out easily.

For example, a palladium catalyst and an alkali carboxylate and, if desired, a trivalent phosphorus or arsenic compound is added to the mixture of solvent and carboxylic acid, and then conjugated diene is poured into the mixture and then reaction is carried out.

In regard to the amount of conjugated diene used there is no special restriction but it is normal to use from 0.1 to 20 mol based on the number of mols of carboxylic acid, preferably from 0.3 to 10 mol.

The molar ratio of carboxylic acid to palladium compound is from 10 to 100,000 mol per mol of palladium in the palladium compound, more preferably from 100 to 50,000.

The reaction can be carried out at a room temperature, but its velocity can be increased by a slight temperature increase.

The reaction is generally carried out at a temperature from 30 to 150° C. while stirring or shaking the reaction system.

After the termination of the reaction, alkali carboxylate is filtered out, and unreacted carboxylic acid is distilled out, and then the ester produced is taken out under vacuum distillation.

When the reaction product is solid, it is refined by means of recrystallization. In carrying out the recrystallization, when said after treatment is carried out at a relatively low temperature such as 200° C., the catalytic system can be recovered while retaining the catalytic activity, and in such circumstances the catalyst can be used over and over again.

The reaction product obtained in accordance with the present invention is very useful for preparing plasticizers, synthetic perfumes and surface active agents, for example.

When a 1,7-diene-3-ol ester of carboxylic acid is present in the reaction system as a solvent, such ester having the aforementioned generic formula $$CH_2=CH-CH_2-CH_2-CH_2-CH-CH=CH_2,$$
$$\underset{O}{\underset{\|}{\overset{|}{O-C-R}}}$$

it is possible to increase the yield of 2,7-diene-1-ol ester of carboxylic acid represented by the general formula $$CH_2=CH-CH_2-CH_2-CH_2-CH=CH-CH_2-\underset{O}{\underset{\|}{O-C-R}}$$

In this case, the amount of 1,7-diene-3-ol ester is not especially restricted, but generally speaking, it is from 0.05 to 10 mol based on the amount of carboxylic acid.

The following examples are illustrative of the invention.

EXAMPLE 1

0.05 mmol of palladium acetate, 0.10 mol of acetic acid, 10 ml. of tert-butanol and alkali acetates shown in the following table were charged into a 100 cc. autoclave.

The air within the autoclave was replaced with nitrogen, 0.25 mol of liquefied 1,3-butadiene was added, and the reaction mixture was stirred at 90° C. for 16 hours.

After termination of the reaction, the autoclave was cooled and thereafter opened, and the reaction product was removed.

The reaction product was analyzed by means of gas chromatography and 2,7-octadienyl acetate and (1-vinyl-5-hexenyl) acetate were confirmed.

The results are shown in Table 1.

The results obtained in similar runs without adding the alkali salts of acetic acid, under the same reaction conditions, are also shown in Table 1.

TABLE 1

| Alkali acetate | Run number | | | Control |
|---|---|---|---|---|
| | 1 | 2 | 3 | |
| | Potassium acetate | Sodium acetate | Lithium acetate | None |
| Amount (mol) | 0.031 | 0.031 | 0.031 | None |
| Molar ratio of alkali acetate to acetic acid | 0.31 | 0.31 | 0.31 | 0 |
| Reaction product: | | | | |
| 2,7-octadienyl acetate (g.) | 7.9 | 7.4 | 5.6 | 1.3 |
| 1-vinyl-5-hexenyl acetate (g.) | 3.1 | 2.7 | 1.4 | 0.2 |

EXAMPLE 2

The reaction between acetic acid and butadiene was carried out by using various types of palladium catalysts and various types of alkali salts of acetic acid in the same manner as in Example 1. The results appear in Table 2.

TABLE 2

| Run No. | Palladium catalyst (mmol) | Alkali acetate (mol) | Alkali acetate acetic acid (molar ratio) | 2,7-octa-dienyl acetate (g.) | 1-vinyl-5-hexenyl acetate (g.) |
|---|---|---|---|---|---|
| 1 | PdCl$_2$ (0.05) | CH$_3$COOK (0.061) | 0.61 | 6.7 | 1.3 |
| 2 | Pd(NO$_3$)$_2$ (0.05) | CH$_3$COONa (0.050) | 0.50 | 7.8 | 3.1 |
| 3 | π-Allyl palladium chloride (0.025) | CH$_3$COOK (0.041) | 0.41 | 7.8 | 2.5 |
| 4 | Glysine palladium (0.05) | CH$_3$COOK (0.020) | 0.2 | 5.7 | 1.4 |
| 5 | Na$_2$PdCl$_4$ (0.05) | CH$_3$COOK (0.031) | 0.3 | 6.9 | 1.5 |

EXAMPLE 3

0.05 mmol of palladium acetate, 0.10 mol of acetic acid, 10 ml. of anisole, 0.29 mol of isoprene and 0.11 mol of potassium acetate were charged into a 200 cc. autoclave (the molar ratio of potassium acetate to acetic acid was 1.1) and after having replaced the air of the autoclave with nitrogen gas, the reaction mixture was stirred at 85° C. for 23 hours.

The distillation was carried out under reduced pressure, and a fraction whose boiling point was from 90 to 105° C./7 mm. Hg was collected. The amount of said fraction was 10 g. The reaction product was a mixture of isomers of the ester produced by reacting 2 mols of isoprene and 1 mol of acetic acid.

The mixture was separated by classifying gas chromatography and it was confirmed that (3,6-dimethyl-2, 7-octadienyl) acetate, (2,7-dimethyl-2, 7-octadienyl) acetate, (2,6-dimethyl-2, 7-octadienyl) acetate, (3,7-dimethyl-2, 7-octadienyl) acetate and (1-vinyl-1, 5-dimethyl-5-hexenyl) acetate were contained in the mixture.

EXAMPLE 4

0.033 mmol of palladium acetate, 0.066 mmol of triphenyl-phosphine, 0.133 mol of acetic acid, 10 ml. of tert-butanol, and the alkali salts of acetic acid shown in Table 3 were charged into a 100 cc. autoclave.

After having replaced the air of the autoclave with nitrogen gas, 0.29 mol of liquefied 1, 3-butadiene was added thereto, and the mixture was stirred at 90° C. for 17 hours.

After the termination of the reaction, the autoclave was cooled, and then the reaction product was removed.

The reaction product was analyzed by means of gas chromatography, and the quantitative analysis of (2,7-octadienyl) acetate and (1-vinyl-5-hexenyl) acetate was carried out. The results are shown in Table 3.

The results of runs carried out without adding alkali salts of acetic acid are also given in Table 3.

TABLE 3

| Alkali acetate | Run number | | | Control |
|---|---|---|---|---|
| | 1 | 2 | 3 | |
| | Potassium acetate | Sodium acetate | Lithium acetate | None |
| Amount (mol) | 0.081 | 0.081 | 0.081 | None |
| Reaction products: | | | | |
| 2,7-octadienyl acetate (g.) | 14.90 | 12.3 | 5.8 | 2.6 |
| 1-vinyl-5-hexenyl acetate (g.) | 3.5 | 2.5 | 1.3 | 0.4 |

EXAMPLE 5

0.033 mmol of dichlorobis (triphenylphosphine) palladium, 1.65 mmol of triphenylphosphine, 0.06 mol of phthalic acid, 10 ml. of anisole and 0.041 mol of potassium phthalate were charged into a 100 cc. autoclave, and tfer having replaced the air within the autoclave with and after having replaced the air within the autoclave with added thereto, and the reaction mixture was stirred at 100° C. for 20 hours.

After having distilled out anisole under a reduced pressure, the reaction product was washed with dilute hydrochloric acid, and then it was dried with anhydrous sodium sulfate.

When distillation was carried out under reduced pressure, 5.1 g. of 2,7-octadienyl phthalate and 11.3 g. of di-2,7-octadienyl phthalate were obtained. The esters thereof were reduced into mono-octyl phthalate and di-octyl phthalate and as a result of analysis, they were confirmed to be the same as those which are commercially marketed.

EXAMPLE 6

0.033 mmol of palladium acetate, 1.0 mmol of triphenyl phosphine, 0.133 mol of acetic acid, 10 ml. of isopropanol, 0.29 mol of isoprene, and 0.080 mol of potassium acetate were charged into a 200 cc. autoclave, and after the air inside the autoclave was replaced with nitrogen gas, the reaction mixture was stirred at 90° C. for 20 hours.

The distillation was carried out under reduced pressure, and a fraction whose boiling point was from 90° C. to 105 C./7 mm. Hg was collected. The amount of said fraction was 19 g.

The reaction product was proved to be a mixture of the isomers of the esters produced by reacting 2 mols of isoprene and 1 mol of acetic acid.

The reaction product was reparated by means of classifying gas chromatography, and it was confirmed that it contained (3,6-dimethyl-2, 7-octadienyl) acetate, (2,7-dimethyl-2, 7-octadientyl) acetate, ,6-dimethyl-2, 7-octadienyl) acetate, (3,7-dimethyl-2, 7-octadienyl) acetate and (1-vinyl-1, 5-dimethyl-5-hexenyl) acetate.

EXAMPLE 7

0.033 mmol of palladium acetate, 0.066 mmol of triphenyl phosphine, 0.133 mol of acetic acid, 10 ml. of tert-butanol, and 0.081 mol of potassium acetate were charged into a 300 cc. autoclave.

After having replaced the air inside the autoclave with nitrogen gas, there was added 42 g. of a "C$_4$ fraction" obtained from cracking of petroleum naphtha (wherein said C$_4$ faction contained 37.4% by weight of butadiene, 46.3% by weight of the mixture of 1-butene and isobutene, 11.2% by weight of 2-butene, 3.2% by weight of butane, and 0.6% by weight of isobutane) and the resulting mixture was stirred at 90° C. for 18 hours.

When distillation was carried out under reduced pressure, and 14.4 g. of 2,7-octadienyl acetate and 3.6 g. of (1-vinyl-5-hexenyl) acetate were obtained.

EXAMPLE 8

0.113 g. (0.5 mmol) of palladium acetate, 0.262 g. (1.0 mmol) of triphenylphosphine, 1.2 g. (12.2 mmol) of potassium acetate, 16 g. (0.266 mol) of acetic acid, and 10 ml. of tert-butanol were charged as a reaction mixture into a 500 cc. autoclave.

After having replaced the air inside the autoclave nitrogen gas, there was added to the reaction mixture 60 g. of "$C_4$ fraction" obtained from cracking of petroleum naphtha (wherein said $C_4$ fraction contained 37.4% by weight of butadiene, 46.3% by weight of the mixture of 1-butene and isobutene, 11.2% by weight of 2-butene, 3.2% by weight of butane, and 0.6% by weight of isobutane), and the reaction mixture was stirred at 85° C. for 20 hours.

After the termination of the reaction, the autoclave was opened, and the reaction mixture was taken out.

36.5 g. of unreacted $C_4$ fraction (containing 76.4% by weight of the mixture of 1-butene and isobutene, 16.9% by weight of 2-butene, 4.8% by weight of butane and 0.7% by weight of isobutane) was separated.

Thereafter the reaction product was distilled under a reduced pressure, and 23.5 g. of 2,7-octadienyl acetate (the boiling point thereof being 97° C./10 mm. Hg) and 10 g. of (1-vinyl-5-hexenyl) acetate (the boiling point thereof being 83° C./10 mm. Hg), was obtained.

EXAMPLE 9

0.0058 g. (0.025 mmol) of palladium acetate, 1.0 g. (3.8 mmol) of triphenylphosphine, 6 g. (0.1 mol) of acetic acid, 1 g. (11 mmol) of potassium acetate and 5 ml. of tert-butanol were charged into a 100 cc. autoclave.

The molar ratio of phosphorus to palladium was 152.

After having replaced the air inside the autoclave with nitrogen gas, 25 cc. (0.28 mol) of liquefied 1,3-butadiene were added into the autoclave, and the reaction mixture was stirred at 100° C. for 20 hours.

The reaction mixture was distilled under reduced pressure, and 11 g. of (2,7-octadienyl) acetate and 5 g. of (1-vinyl-5-hexenyl) acetate were separated.

The residue containing the catalyst was left out.

Thus resulting residue, 6 g. of acetic acid, and 5 ml. of tert-butanol were charged into the autoclave.

After having replaced the air inside the autoclave with nitrogen gas, 25 cc. of liquefied 1,3-butadiene were added into the autoclave, and the reaction mixture was stirred at 100° C. for 20 hours.

The reaction mixture was distilled under reduced pressure, and 10 g. of 2,7-octadienyl acetate and 5 g. of (1-vinyl-5-hexenyl) acetate were obtained.

EXAMPLE 10

0.0023 g. (0.01 mmol) of palladium acetate, 1.0 g. (3.82 mmol) of triphenylphosphine, 1.0 g. of potassium acetate, 17 g. of adipic acid and 60 ml. of tert-butanol were charged into a 200 cc. autoclave and the molar ratio of phosphorus against palladium was 382.

After having replaced the air inside the autoclave with nitrogen gas, 50 cc. of liquefied 1,3-butadiene were added thereto and the reaction mixture was stirred at 100° C. for 5 hours.

After having distilled out tert-butanol under reduced pressure, the reaction mixture was washed with dilute hydrochloric acid, and then it was dried with anhydrous sodium sulfate.

The reaction product thus obtained was distilled under reduced pressure and 36 g. of di-2,7-octadienyl adipate (the boiling point thereof being 207° C./3 mm. Hg) were obtained.

EXAMPLE 11

0.0023 g. (0.01 mmol) of palladium acetate, 1.0 g. (3.82 mmol) of triphenylphosphine, 1.2 g. of potassium acetate, 69 g. of fumaric acid, and 30 ml. of dimethylformamide were added into a 100 cc. autoclave. The molar ratio of phosphorus to palladium was 382.

After having replaced the air inside the autoclave with nitrogen gas, 25 cc. of liquefied 1,3-butadiene were added thereto, and the reaction mixture was stirred at 83° C. for 50 hours, and dimethyl formamide was distilled out under reduced pressure. The reaction product was washed with diluted hydrochloric acid, and was dried with anhydrous sodium sulfate.

When distilled under a reduced pressure, 15.5 g. of di-2,7-octadienyl fumarate (the boiling point thereof being 150° C./0.3 mm. Hg) was obtained.

EXAMPLE 12

0.0068 g. (0.03 mmol) of palladium acetate, 0.79 g. (3.0 mmol) of triphenylphosphine, 1.3 g. of potassium acetate, 7 g. of trimellitic acid, and 80 ml. of benzene were charged into a 200 cc. autoclave.

The molar ratio of phosphorus to palladium was 100.

After having replaced the air inside the autoclave with nitrogen gas, 35 cc. of liquefied 1,3 butadiene were added thereto, and the reaction mixture was stirred at 110° C. for 45 hours.

Benzene was distilled out under reduced pressure, and the residue obtained was recrystallized. 2 g. of 2,7-octadienyl trimellitate, 3 g. of di-2,7-octadienyl trimellitate, and 8 g. of tri-2,7-octadienyl trimellitate were obtained.

EXAMPLE 13

0.057 g. (0.25 mmol) of palladium acetate, 0.13 g. (0.50 mmol) of triphenylphosphine, 1.2 g. of potassium acetate, 11.7 g. of n-butyric acid, and 5 ml. of tert-butanol were charged into a 100 cc. autoclave.

After having replaced the air inside the autoclave with nitrogen gas, 25 cc. of liquefied 1,3-butadiene were added into the autoclave, and the reaction mixture was stirred at 90° C. for 17 hours.

The reaction mixture was distilled under reduced pressure, and 15.0 g. of 2,7-octadienyl/n-butyrate (the boiling point thereof being 125° C./3 mm. Hg) and 4.0 g. of (1-vinyl-5-hexenyl)/n-butyrate (the boiling point thereof being 100° C./3 mm. Hg were obtained.

EXAMPLE 14

0.087 g. (0.25 mmol) of palladium benzoate, 0.13 g. (0.50 mmol) of triphenylphosphine, 1.5 g. of potassium benzoate, 12.2 g. of benzoic acid, and 30 ml. of tert-butanol were added into a 100 cc. autoclave.

After having replaced the air inside the autoclave with nitrogen gas, 25 cc. of liquefied 1,3-butadiene were added into the autoclave, and the reaction mixture was stirred at 90° C. for 20 hours.

Tert-butanol was distilled out under reduced pressure and the residue was washed with dilute hydrochloric acid, and then was dried with anhydrous sodium sulfate.

When distilled under reduced pressure, 15 g. of 2,7-octadienyl benzoate (the boiling point thereof being 145° C./2 mm. Hg) and 5 g. of (1-vinyl-5-hexenyl) benzoate (the boiling point thereof being 129° C./3 mm. Hg) were obtained.

EXAMPLE 15

0.057 g. (0.25 mmol) of palladium acetate, 0.13 g. (0.5 mmol) of triphenylphosphine, 1.2 g. (0.133 mol) of potassium acetate, 8 g. (0.133 mol) of acetic acid, 50 ml. of tert-butanol, and 7.5 g. of (1-vinyl-5-hexenyl) acetate were charged into a 100 cc. autoclave.

After having replaced the air inside the autoclave with nitrogen gas, 25 cc. (0.28 mol) of liquefied 1,3-butadiene were added thereto, and the reaction mixture was stirred at 85° C. for 18 hours.

When distilled under reduced pressure, 7.2 g. of (1-vinyl-5-hexenyl) acetate (the boiling point thereof being 83° C./10 mm. Hg) and 18.5 g. of 2, 7-octadienyl acetate (the boiling point thereof being 97° C./10 mm. Hg) were obtained.

As stated, compounds prepared according to this invention are useful as plasticizers and in the manufacture of synthetic perfume. For example, octyl phthalate prepared by reducing the corresponding unsaturated ester in Example 5, or octyl adipate prepared by reducing the corresponding unsaturated ester in Exaample 10, are useful materials for plasticizers and for synthetic perfumes.

EXAMPLE 16

0.033 mmol of palladium acetate, 1.0 mmol of triphenylphosphine, 0.133 mol of acetic acid, 10 ml. of isopropanol, 0.29 mol of 2,3-dimethyl-1,3-butadiene, and 0.080 mol of potassium acetate were added into a 200 cc. autoclave.

After having replaced the air inside the autoclave with nitrogen gas, the reaction mixture was stirred at 85° C. for 20 hours.

When distilled under reduced pressure, 18 g. of (2, 3, 6, 7-tetra methyl-2,7-octadienyl) acetate was obtained.

EXAMPLE 17

0.033 mmol of palladium acetate, 1.0 mmol of triphenylphosphine, 0.133 mol of acetic acid, 20 ml. of tert-butanol, 0.29 mol of chloroprene, and 0.080 mol of potassium acetate were added into a 200 cc. autoclave.

After having replaced the air inside the autoclave with nitrogen gas, the reaction mixture was stirred at 80° C. for 18 hours.

When distilled under reduced pressure, 10 g. of (3,7-dichloro-2,7-octadienyl) acetate was obtained.

EXAMPLE 18

0.033 mmol of palladium acetate, 1.0 mmol of triphenylphosphine, 0.10 mol of acetic acid, 20 ml. of isopropanol, 0.25 mol of 2-ethyl-1,3-butadien, and 0.060 mol of potassium acetate were added into a 200 cc. autoclave.

After having replaced the air inside the autoclave with nitrogen gas, the reaction mixture was stirred at 90° C. for 18 hours.

When distilled under reduced pressure, 7 g. of (3,7-diethyl-2, 7-octadienyl) acetate was obtained.

The following is claimed:

1. The method of selectively producing a 2,7-diene-1-ol-ester of acetic acid comprising reacting a conjugated diene and acetic acid in the presence of a catalytically effective amount of a palladium catalyst and an alkali metal carboxylate of the formula R—COOM, wherein M is an alkali metal and R is a hydrocarbon radical, said hydrocarbon radical having 1–30 carbon atoms, nd wherein the reaction is conducted in a 1-7-diene-3-ol-ester of acetic acid reaction solvent.

2. Method according to claim 1 wherein said alkali carboxylate is selected from the group consisting of the potassium, sodium and lithium salt of the carboxylic acids selected from the group consisting of formic acid, acetic acid, propionic acid, butyric acid, adipic acid, methacrylic acid, fumaric acid, benzoic acid, phthalic acid, toluylic acid, trimellitic acid and naphthalene carboxylic acid.

3. Method according to claim 1 wherein the conjugated diene has 4 carbon atoms on the main chain thereof.

4. Method according to claim 1 wherein said conjugated diene is represented by the formula

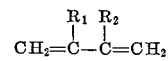

wherein $R_1$ and $R_2$ are H, lower alkyl of 1 to 5 carbon atoms or a halogen selected from the group consisting of fluorine, chlorine, bromine and iodine.

5. Method according to claim 1 wherein said conjugated diene is selected from the group consisting of 1, 3-butadiene, isoprene, chloroprene, 2-ethyl-1, 3-butadiene and 2,3-dimethyl-1,3-butadiene.

6. Method according to claim 1 wherein from 5 to 100,000 mols of said alkali carboxylate are present per mol of palladium.

7. Method according to claim 1 wherein said palladium catalyst is selected from the group consisting of zero valent and divalent palladium.

8. Method according to claim 1 wherein the reaction is carried out in the presence of more than 2 mols of trivalent compound selected from the group consisting of phosphorus and arsenic compounds, based on the mols of palladium present.

9. Method according to claim 8 wherein said phosphorus compound is an aromatic phosphine.

10. Method according to claim 8 wherein said arsenic compound is an aromatic arsine.

References Cited
UNITED STATES PATENTS
3,534,088  10/1970  Bryant et al. _____ 260—475

LORRAINE A. WEINBERGER, Primary Examiner

R. S. WEISSBERG, Assistant Examiner

U.S. Cl. X.R.

260—410.9 N, 465.4, 468 R, 469, 471 R, 473 R, 475 N, 476 R, 482 R, 84 R, 484 P, 485 N, 486 R, 487, 488 H